United States Patent
Atalla et al.

(10) Patent No.: US 10,415,744 B1
(45) Date of Patent: Sep. 17, 2019

(54) HINGE HANGER AND ACCESSORY COMPONENTS

(71) Applicants: Bill Atalla, Reno, NV (US); Carolyn Marie Atalla, Washoe Valley, NV (US)

(72) Inventors: Bill Atalla, Reno, NV (US); Carolyn Marie Atalla, Washoe Valley, NV (US)

(73) Assignee: Hinge Hanger LLC, Reno, NV (US)

( * ) Notice: Subject to any disclaimer, the term of this patent is extended or adjusted under 35 U.S.C. 154(b) by 0 days.

(21) Appl. No.: 15/356,534

(22) Filed: Nov. 18, 2016

Related U.S. Application Data

(60) Provisional application No. 62/386,228, filed on Nov. 19, 2015.

(51) Int. Cl.
 *A47G 25/06* (2006.01)
 *F16M 13/02* (2006.01)
 *E05D 11/00* (2006.01)

(52) U.S. Cl.
 CPC ............ *F16M 13/02* (2013.01); *E05D 11/00* (2013.01); *A47G 25/0621* (2013.01)

(58) Field of Classification Search
 USPC .......... 248/339, 304, 307, 308; 16/233, 269; 211/119.004, 96, 99, 100
 See application file for complete search history.

(56) References Cited

U.S. PATENT DOCUMENTS

| | | | |
|---|---|---|---|
| 465,259 A * | 12/1891 | Glover | |
| 632,234 A * | 9/1899 | Burgress | |
| D31,995 S | 12/1899 | Alker | |
| 741,004 A * | 10/1903 | Nostran | |
| 985,062 A * | 2/1911 | Rendlennan | |
| 1,333,692 A | 3/1920 | Severin | |
| 1,817,962 A * | 8/1931 | Breuer | A47H 19/00 160/349.2 |
| D224,757 S | 9/1972 | Bolen | |
| 4,606,482 A * | 8/1986 | McHugh | A47G 25/30 223/88 |
| 4,979,712 A | 12/1990 | Rios | |
| D330,537 S | 10/1992 | Scott | |
| 5,433,413 A * | 7/1995 | Adams | A47G 1/17 248/205.3 |
| D468,193 S | 1/2003 | Ohm et al. | |
| 6,729,358 B1 | 5/2004 | Moffatt | |
| D611,324 S | 3/2010 | Dawson | |
| D623,041 S | 9/2010 | Ayrest | |
| D648,208 S | 11/2011 | Platt | |

(Continued)

*Primary Examiner* — Alfred J Wujciak
(74) *Attorney, Agent, or Firm* — Kerr IP Group, LLC

(57) ABSTRACT

A hinge hanger and accessory components are described. In a one illustrative embodiment, the hinge hanger includes a curved supporting connector, a hook component and an arm component. The curved supporting connector is configured to interface with a cylindrical component. Also, the curved supporting connector has a top lip that interfaces with the cylindrical component. Additionally, the curved supporting connector has a bottom end that interfaces with the cylindrical component. The hook component is disposed near the bottom end of the curved supporting connector. The arm component extends from the curved supporting connector. The arm component includes a vertical upright component proximate to a distal end of the arm component. The arm component also includes an elastic base at the distal end of the arm component.

7 Claims, 12 Drawing Sheets

(56) References Cited

U.S. PATENT DOCUMENTS

| | | | |
|---|---|---|---|
| D661,574 S | 6/2012 | Platt | |
| D668,938 S | 10/2012 | Morales | |
| 8,387,292 B1 | 3/2013 | Rasmus | |
| 8,602,370 B2* | 12/2013 | McKenzie | A47G 25/1464 248/215 |
| D702,540 S | 4/2014 | Kacines | |
| D734,134 S | 7/2015 | Bauerle | |
| D748,450 S | 2/2016 | Ganter | |
| D757,528 S | 5/2016 | Wyss | |
| 9,560,927 B2* | 2/2017 | Krumpe | A47G 25/0607 |
| D783,387 S | 4/2017 | Wilson | |
| D784,119 S | 4/2017 | Brooks | |
| D792,190 S | 7/2017 | Lewis | |
| D817,744 S | 5/2018 | Atalla | |
| 2006/0016943 A1 | 1/2006 | Thompson | |
| 2008/0272269 A1 | 11/2008 | Moravsky et al. | |
| 2010/0031471 A1 | 2/2010 | Tang | |
| 2011/0005033 A1 | 1/2011 | Mukherjee et al. | |
| 2013/0168517 A1* | 7/2013 | Chu | A47K 10/12 248/304 |
| 2014/0140204 A1 | 5/2014 | Lynar et al. | |
| 2017/0219125 A1 | 8/2017 | Atragene et al. | |
| 2017/0219161 A1 | 8/2017 | Dempsey et al. | |

* cited by examiner

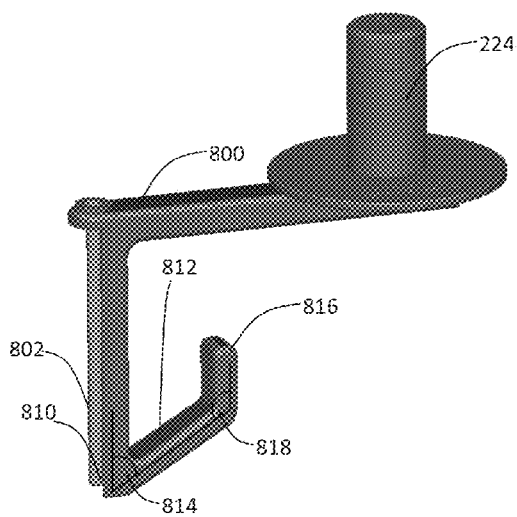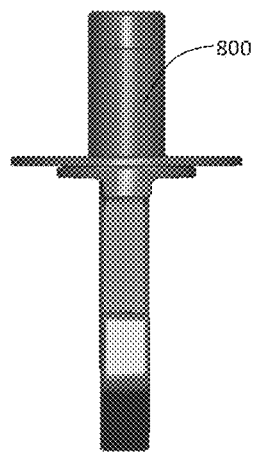
Figure 8A  Figure 8B
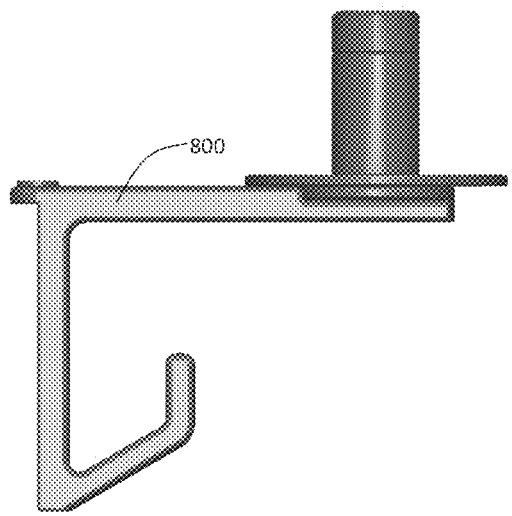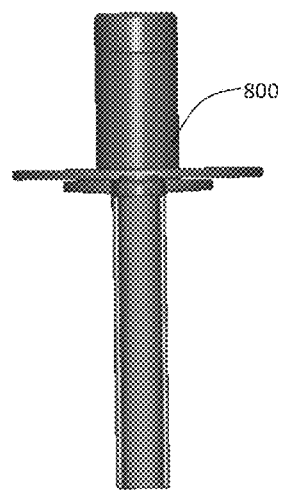
Figure 8C  Figure 8D

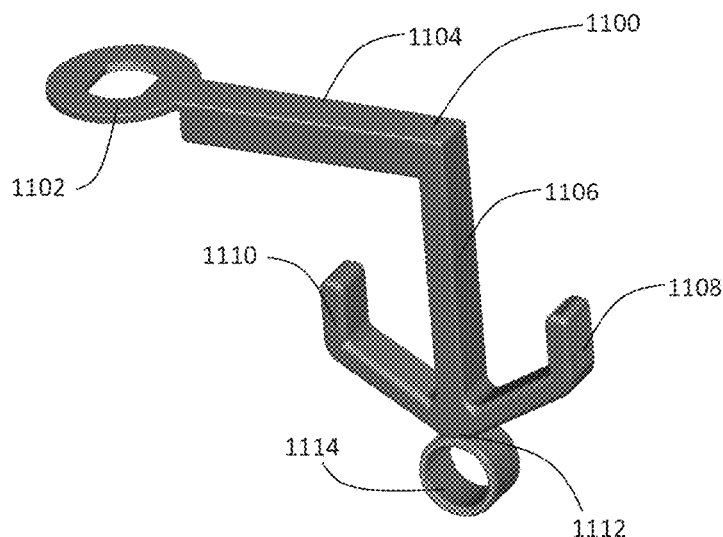
Figure 11A
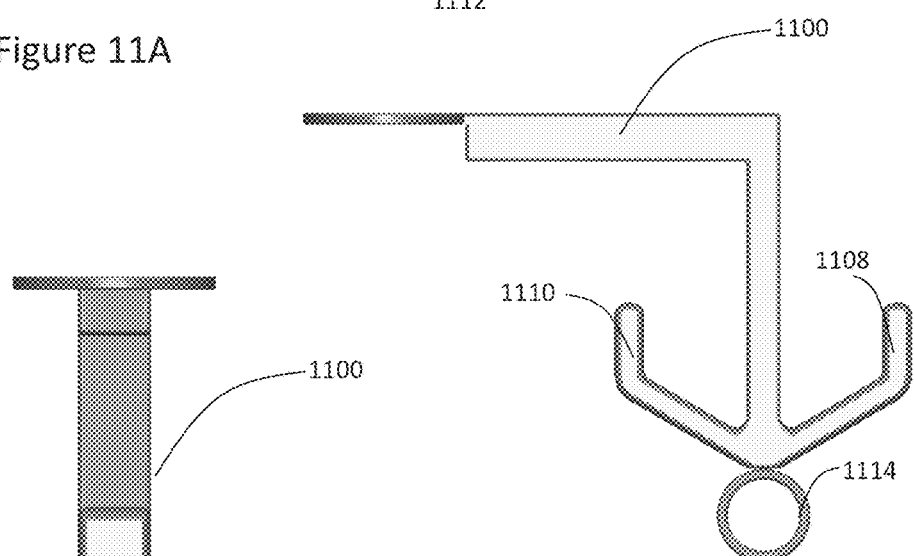
Figure 11B
Figure 11C

HINGE HANGER AND ACCESSORY COMPONENTS

CROSS REFERENCE

This patent application claims the benefit of U.S. provisional patent application 62/386,228 filed on Nov. 19, 2015 entitled HINGE HANGER AND ACCESSORIES, which is hereby incorporated by reference in its entirety.

FIELD

The description and embodiment presented herein is related to a hinge hanger base unit with accessory components. More specifically, the illustrative embodiments presented herein are related to hinge hanger base unit, the accessory components and the methods for implementing the hinge hanger.

BACKGROUND

Household or office doors have been used as supports for hangers or hooks for articles of clothing. For example, simple hooks are attached to the door by screws or, in certain cases, by adhesives. Over-the-door hangers are designed to slip over the top of the door and support a bracket mechanism. Sometimes, the bracket is fixed and in others it is adjusted upward and to fold it out of the way when the door is open and to move it back into horizontal operating position when the door is closed.

With respect to permanently installed hooks, they have a limited capacity and involve a permanent type attachment to the door usually with resulting marring on the door surface. The over-the-top-of-the-door hangers characteristically interfere with the opening and closing of the door and often result in damage to the door frame.

Additionally, door hinges and various attachments to door hinges may be designed to support garments, coats or towels. The hinges may include a garment supporting hook that mounts on a door hinge. Also, hanger brackets may support articles of clothing and may be readily secured to and supported by a vertically disposed hinge. The door hinges and related attachments may be located in places that are not heavily used such as closets or in small apartments or bedrooms having inadequate closet space.

However, there are various challenges to utilizing door hinge attachments because of their limited capabilities. For example, door hinge attachments are not used for holding paper towels or toilet paper rolls. Commonly, paper towels and specifically extra toilet paper rolls are stored near the toilet which is an unhealthy practice since most people buy in bulk and those rolls may not be individually wrapped.

Thus, it would be beneficial to provide an apparatus, system and method for removing paper towels and toilet paper from the floor or away from the back of the toilet. Additionally, it would be beneficial to provide a holder for toilet paper, paper towels or hooks combined in one unit and hinge.

SUMMARY

A hinge hanger and accessory components are described. In one illustrative embodiment, the hinge hanger includes a curved supporting connector, a hook component and an arm component. The curved supporting connector is configured to interface with a cylindrical component. Also, the curved supporting connector has a top lip that interfaces with the cylindrical component. Additionally, the curved supporting connector has a bottom end that interfaces with the cylindrical component. The hook component is disposed near the bottom end of the curved supporting connector. The arm component extends from the curved supporting connector. The arm component includes a vertical upright component proximate to a distal end of the arm component. The arm component also includes an elastic base at the distal end of the arm component.

In another illustrative embodiment, the hinge hanger includes a curved supporting connector, a hook component, an arm component and vertical upright tube. The curved supporting connector interfaces with a cylindrical component. The curved supporting connector has a top lip that interfaces with the cylindrical component. Additionally, the curved supporting connector has a bottom end that interfaces with the cylindrical component. The hook component is disposed at the bottom end of the curved supporting connector. The arm component extends from the curved supporting connector. Additionally, the arm component includes a vertical arm element proximate to a distal end of the arm component. The vertical upright tube interfaces with the vertical arm element corresponding to the arm component. The hinge hanger may include an elastic base that interfaces with the vertical arm element.

In yet another illustrative embodiment, the hinge hanger includes a curved supporting connector, a hook component, an arm component, a vertical upright tube and an elastic base. The curved supporting connector interfaces with a cylindrical component. Additionally, the curved supporting connector has a top lip that interfaces with the cylindrical component. Furthermore, the curved supporting connector has a bottom end that interfaces with the cylindrical component. The hook component is disposed at the bottom end of the curved supporting connector. The arm component extends from the curved supporting connector. Also, the arm component includes a threaded vertical arm element proximate to a distal end of the arm component. The vertical upright tube has a threaded end that interfaces with the threaded vertical arm element corresponding to the arm component. The elastic base is disposed at the distal end of the arm component and the elastic base is further disposed between the vertical upright tube and the arm component.

In one embodiment, the cylindrical component may be associated with a door hinge. In another embodiment, the cylindrical component includes a bracket having a hollowed cylindrical component that interfaces with the curved supporting connector. The vertical arm element may be approximately 13 inches or 4.5 inches in some of the illustrative embodiments.

Additionally, the hinge hanger may include an accessory component that interfaces with the vertical arm element. The accessory component may include an accessory arm component that includes a second hook component. Also, the accessory component may include a basket component.

DRAWINGS

The present invention will be more fully understood by reference to the following drawings which are for illustrative, not limiting, purposes.

FIG. 3A shows a front view of an illustrative universal hinge bracket.

FIG. 3B, FIG. 3C and FIG. 3D shows various views of the universal hinge bracket.

FIG. 8A shows a perspective view of a "modern" hinge hanger base unit.

FIG. 8B shows a front view of the modern hinge hanger base unit.

FIG. 8C shows a side view of the modern hinge hanger base unit.

FIG. 8D shows a back view of the modern hinge hanger base unit.

FIG. 11A shows a perspective view of a dual hook accessory component.

FIG. 11B shows a side view of the dual hook accessory component.

FIG. 11C shows a front view of the dual hook accessory component.

DESCRIPTION

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the apparatus and systems described herein may vary as to configuration and as to details. Additionally, the methods may vary as to details, order of the actions, or other variations without departing from the illustrative method disclosed herein.

The illustrative hinge hanger and accessory components presented herein includes a base unit that is easily installed on any door hinge (or the universal bracket described herein), which provides the ability to store at least one roll of toilet paper or a paper towel roll and hang clothing or towels from the illustrative flat hook. In one illustrative embodiment, a common door hinge is used as an installation point that supports the hinge hanger base unit and modular accessories that attach to the base unit. The hinge hanger enables unused storage space that is located behind any door or door hinge to be used as storage space. Additionally, in combination with the universal bracket, the base unit and accessories can be used with any location.

The embodiments presented herein are related to a hinge hanger base unit and accessory components (also referred to as accessories) that interface with the base unit. Methods for using the hinge hanger base unit and accessory components are also described. Generally, the hinge hanger may be operatively coupled to a door hinge, which, by way of example and not of limitation, includes a standard butt hinge.

A hinge is a mechanical bearing that connects two solid objects. The hinge permits a limited angle of rotation between the two objects. Additionally, the objects connected by a hinge rotate relative to each other about a fixed axis of rotation.

There are many types of door hinges including a butt hinge. The butt hinge is commonly used in interior doors because of its clean look. The butt hinge consists of two rectangular leaves with screw holes. The leaves are joined by a pin or metal rod. When the pin is withdrawn, the leaves will separate. One leaf is recessed on to the edge of the door and the other leaf is fixedly coupled to the door framework, i.e. hinge jamb. When the door is closed the leaves meet or butt together with only the pin showing.

Figure 1A:
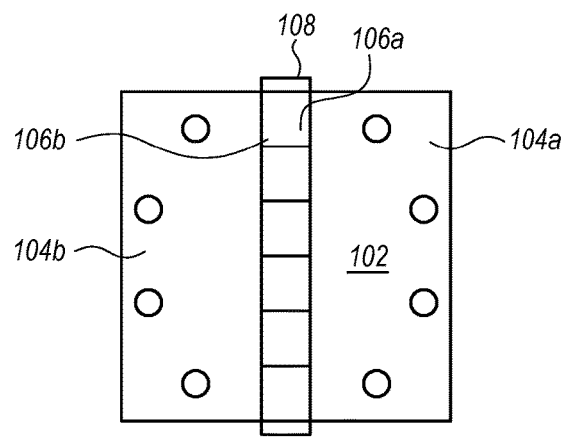
FIG. 1A shows an illustrative butt hinge.

Referring to FIG. 1A, there is shown an illustrative butt hinge 102. The butt hinge 102 includes a leaf 104a and 104b that each has at least one knuckle 106a and 106b, respectively. A hinge pin 108 is fed through the knuckles. Alternatively, a universal hinge bracket that is shown in FIG. 3 may be used to interface with the hinge hanger base unit. Thus, the hinge hanger base unit does not require a door hinge.

Figure 1B:
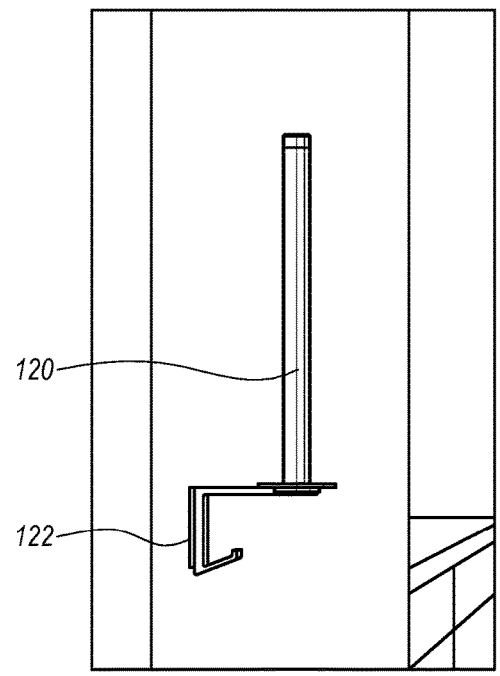
FIG. 1B and FIG. 1C show a view of the hinge hanger base unit coupled to a hinge.
Figure 1C:
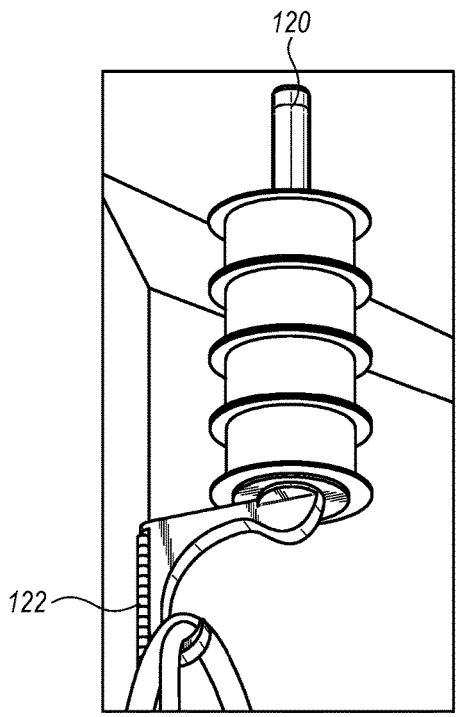

Referring to FIG. 1B and FIG. 1C, there is shown a view of the hinge hanger base unit coupled to a hinge. The illustrative hinge hanger base unit 120 is coupled to hinge 122. The illustrative hinge hanger base unit may be used to support coats, dresses, hats, purses, ties, garments, paper towels, toilet paper rolls, decorative tape and other such items. Additionally, the hinge hanger base unit and accessory components may be used to support hangers, ties and appliances. Furthermore, the hinge hanger base unit and accessory components can be used to hold appliances, jewelry, ornaments and other such decorative and utilitarian items.

The hinge hanger base unit and accessory components presented herein are not affected by the opening or closing of the door; thus, the door may be used in its conventional capacity. Additionally, the stored materials are hidden from view when the door is in an open position Note, the hinge hanger base unit and accessory components may include a universal bracket that is capable of being fixedly coupled to any surface including a door, door frame, wall or any other flat surface. Thus, the universal bracket can expand the capabilities of the uses for the hinge hanger base unit and the accessory components.

Figure 2:
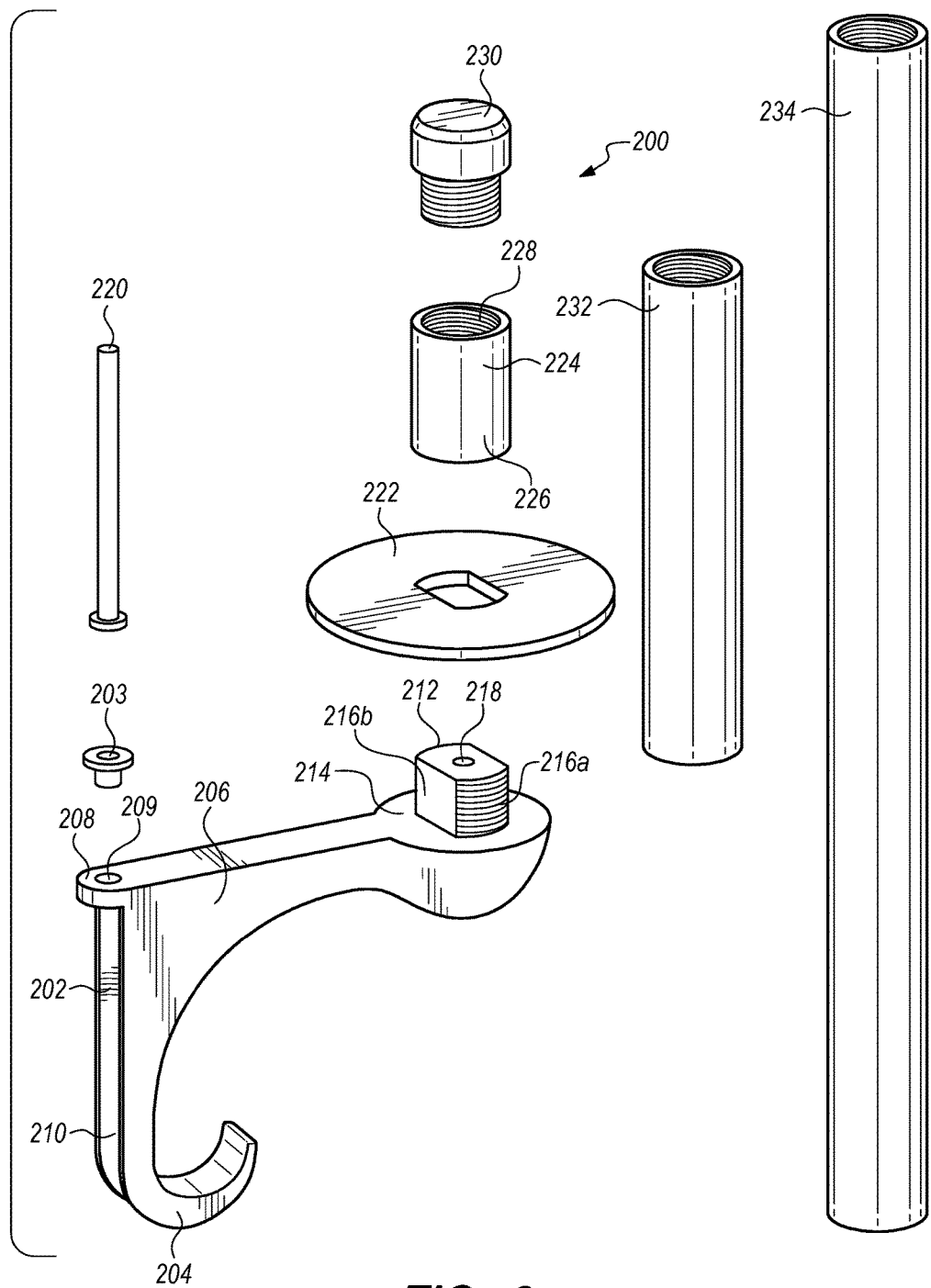
FIG. 2 shows an isometric view of the various components and elements for an illustrative hinge hanger base unit embodiment.

Referring to FIG. 2, there is shown an isometric view of the various components and elements for a plurality of hinge hanger base unit embodiments that are presented herein. For example, the illustrative hinge hanger 200 embodiment may also be referred to as a "traditional" hinge hanger embodiment. The various components include a curved supporting connector 202, a hook component 204 and an arm component 206.

The curved supporting connector 202 is configured to interface with a cylindrical component. By way of example and not of limitation, the cylindrical component may be a door hinge 102 (see FIG. 1A). As described in further detail below in FIG. 3, the universal hinge bracket may also provide the cylindrical component that interfaces with the curved supporting connector 202. The curved supporting connector 202 includes a "curved spine" that lies against and surrounds the illustrative door hinge 102; and the curved spine wraps around the door hinge for strength and support.

The curved supporting connector 202 has a top lip 208 that also interfaces with the cylindrical component, e.g. door hinge 102. The top lip 208 includes a hinge hole 209 that receives the hinge pin 108 from the illustrative butt hinge 102. The illustrative door hinge 102 may be sized for different hinge pins and the grommet 203 can be used to accommodate smaller diameter hinge pins.

The curved supporting connector 202 also has a bottom end 210 that interfaces with the cylindrical component. The hook component 204 is disposed near the bottom end 210 of the curved supporting connector 202. The illustrative hook component 204 includes a curved hook with rounded edges to prevent garments from being damaged by the hook component 204.

The illustrative arm component 206 extends from the curved supporting connector 208. The arm component 206 includes a vertical upright component proximate to a distal end 214 of the arm component 206. The illustrative distal end 214 includes a rounded plate.

By way of example and not of limitation, the illustrative vertical upright component includes a threaded cylindrical protuberance 212. A portion of the threaded cylindrical protuberance 212 includes two vertical cuts 216a and 216b that are opposite one another. Each of the vertical cuts 216a and 216b are near the perimeter of the cylindrical protuberance 212. The cylindrical protuberance also includes a cylindrical void 218 along the centerline of the threaded cylindrical protuberance 212. The cylindrical void 218 is configured to receive a hinge removal pin 220, which is used to remove the hinge pin 108 (see FIG. 1) from the illustrative butt hinge 102 (see FIG. 2).

In addition to the threaded cylindrical protuberance 212, the vertical upright component includes an elastic base 222, which is also disposed at the distal end of the arm component 206. The elastic base 222 is configured to fit over the threaded cylindrical protuberance 212 having the vertical cuts 216a and 216b. The elastic base 222 prevents the hinge hanger base unit 200 from scratching or scuffing doors, wall and fixtures that may contact or hit hinge hanger base unit 200. The elastic base may be composed of a plastic or rubberized compound which permits contact with a wall or door without leaving a mark. Note, the elastic base 222 may contact the illustrative door or wall when the vertical upright component is not holding an object such as a roll of toilet paper or a paper towel. However, if an illustrative roll of toilet paper is received by the vertical upright component, the illustrative toilet paper roll will be contacting the door or wall and there will no scuffing of the door or wall when the door is opened or closed.

The elastic base 222 may be composed of a plastic material. The plastic material may be composed from an organic polymer such as polyethylene, PVC, nylon, polypropylene and the like material that can be molded into shape while soft and then set into a rigid or slightly elastic form. The elastic base may also be composed of an elastomeric material such a rubber. By way of example and not of limitation, the elastic base 222 is composed of a slightly elastic materials such as a plastic material.

The illustrative vertical upright component may also include a vertical upright tube 224 that has a bottom threaded end 226. The bottom threaded end 226 is coupled to the threaded cylindrical protuberance 212 and braces the elastic base 222 in place. Thus, the elastic base 222 is placed over the threaded cylindrical protuberance 212 and one of the vertical upright tubes 224, 232 or 234 may be used to secure the elastic base.

The vertical upright tube 224 may also includes a top threaded end 228 that may be coupled to a threaded cap 230. The height of the vertical upright component depends principally on the length of the illustrative vertical upright tube 224. By way of example and not of limitation, the height of the vertical upright tube 224 may be sufficient to accommodate the hinge removal pin 220.

In another embodiment, an illustrative vertical upright tube 232 may be approximately 4.5 inches long; this length can be used to accommodate a roll of toilet paper or any other product having a cylindrical opening. In yet another embodiment, an illustrative vertical upright tube 234 may be 13 inches long, which accommodates a roll of paper towels, three rolls of toilet paper or any product having a cylindrical opening. There are various lengths to the vertical upright component, which depend on the particular application or use case for the hinge hanger base unit 200. Thus, the length of the illustrative vertical upright tube may vary from a cap having a nominal height to a much more elongated vertical upright tube such as the illustrative 13 inch vertical tube.

In an even further illustrative embodiment, the height of the vertical upright tube 224 may be even smaller than the height of the hinge removal pin 220 and may not include a vertical upright tube 224. Thus, a threaded cap (not shown) may be configured to interface directly with the threaded cylindrical protuberance 212 and the elastic base 222 without the need for a vertical upright component.

In yet another illustrative embodiment, the vertical upright component may also be formed from a single mold. In the single mold embodiment, the vertical upright component is integrated into arm component 206 so that the arm component includes the base, the vertical upright tube and the cap as a single integrated unit. Thus, the modular elements are integrated into the hinge hanger base unit as shown in FIG. 1B.

In operation, the hinge hanger base unit 200 is easily installed by removing the hinge pin 108 from the illustrative hinge 102 and reinserting the hinge pin 108 through the hinge hole 209. Once installed, the hinge hanger base unit may be used as described herein. The hinge hanger base unit 200 is designed to not interfere with a door's full opening capability and will not harm the hinge, the door or the adjoining wall.

The illustrative hinge hanger base unit 200 may be installed on conventional door hinges. The only specific tools required for installation are the same tools that are used to remove the hinge pin 108 from the door hinge 102 and then tap the hinge pin 108 back in place. Additionally, accessory components such as baskets, bins, multi-towel holders and multi-hooks can be attached to the hinge hanger base unit 200. These accessory components provide additional storage.

Figure 3D:
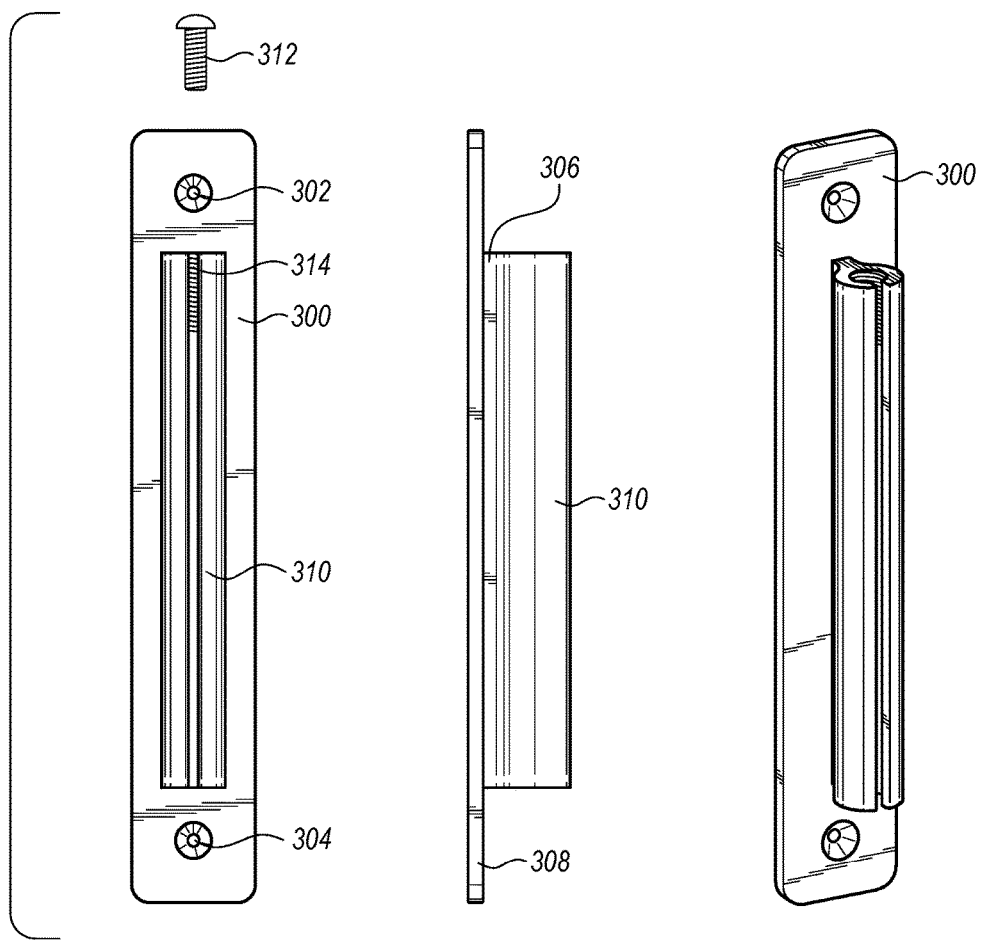
Figure 3D:
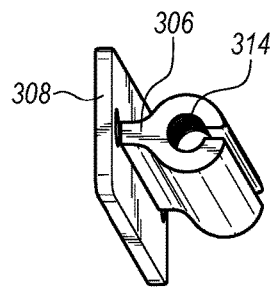

Referring to FIG. 3A there is shown a front elevation view of an illustrative universal hinge bracket. The universal hinge bracket 300 can be fixedly coupled to any surface with fasteners—and then the universal hinge bracket can be coupled to the base unit. More specifically, the universal hinge bracket 300 includes a top beveled opening 302 and a bottom beveled opening 304. The top beveled opening 302 and bottom beveled opening 304 are configured to receive a screw 312, a nail or other such fastener to fixedly couple the universal hinge bracket to a surface such as a wall, a door, a door frame or other such surface that can receive the universal hinge bracket 300. In the illustrative embodiment, the screw 312 is received by the threads 314 located at the top of cylindrical element 310. The cylindrical element includes a channel that runs along the length of the cylindrical element and which is disposed opposite to the stem 306 shown in FIG. 3B and FIG. 3D.

Referring to FIG. 3B, FIG. 3C and FIG. 3D there is shown various views of the universal hinge bracket 300. FIG. 3B shows a left elevation view, which is at 90° from the front view shown in FIG. 3A. FIG. 3C shows an isometric top view of the universal hinge bracket. FIG. 3D presents an isometric top view. The universal hinge bracket includes a stem 306 that is coupled to a bracket plate 308. The back of bracket plate 308 is configured to interface with the illustrative surface of a wall or door. The stem 306 extends along the length of a hollow cylindrical element 310. The hollow cylindrical element 310 includes at least one thread end that can interface with screw 312. The threaded ends are on the inside of the hollowed cylindrical element 310. An illustrative threaded end 314 is shown in FIG. 3D.

In another illustrative embodiment (not shown), there may also be separate threads disposed at the bottom of the cylindrical element 310. Thus, the cylindrical element 310 may have threads disposed on both ends. The threads on both ends provide an added level of simplicity when installing the universal hinge hanger because a fastener can interface with the threads regardless of the orientation of the hinge hanger.

In operation, the universal hinge bracket 300 is fixedly coupled to a flat surface using fasteners that pass through the top beveled opening 302 and the bottom beveled opening 304. The curved supporting member 202 of the hinge hanger base unit 200 interfaces with the cylindrical element 310 corresponding to the universal hinge bracket 300. The screw 312 is configured to pass through the hinge hole 209 associated with the top lip 208 and is received by the top threaded end of the cylindrical element 310.

The screw 312 may be loosely tightened so that the curved supporting member 202 is rotatably coupled to the cylindrical element 310. Alternatively, the screw may be tightened more excessively so that curved supporting member 202 is fixedly coupled to the cylindrical element 310.

Figure 4A:
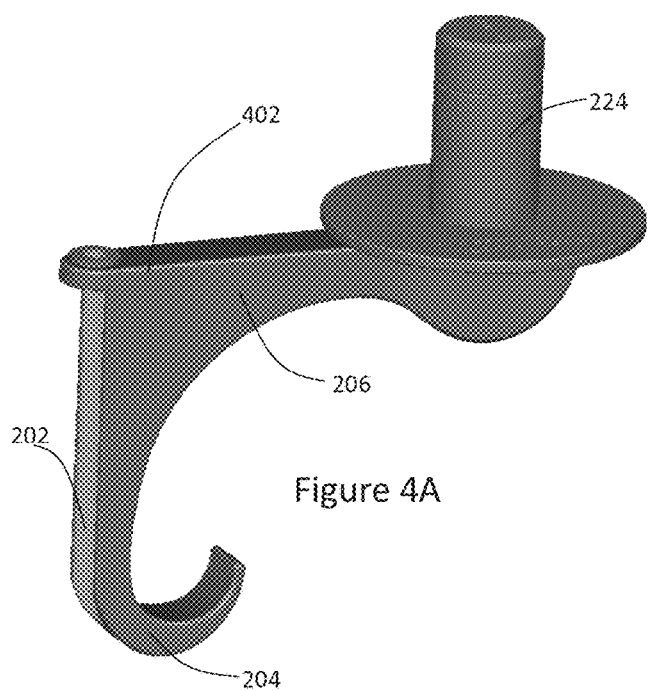
FIG. 4A shows a perspective view of a traditional hinge hanger base unit.

Referring to FIG. 4A there is shown a perspective view of a traditional hinge hanger base unit 402 with a small vertical elongated tube. The traditional hinge hanger base unit 402 includes the curved hook component 204 that includes a curved hook with rounded edges to prevent garments from being damaged by the hook component 204. Additionally, the traditional hinge hanger base unit 402 includes a small vertical upright tube 224 that is approximately 1-2 inches in height.

Figure 4B:
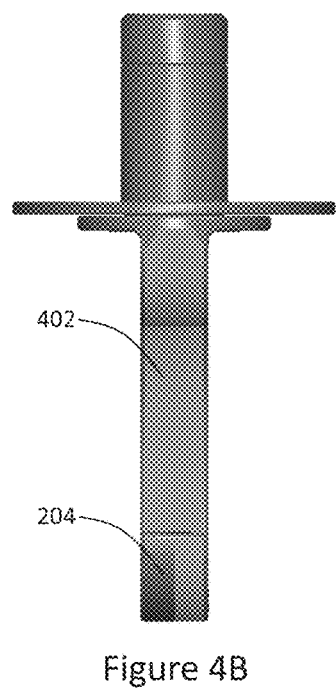
FIG. 4B shows a front view of the traditional hinge hanger base unit.

Referring to FIG. 4B there is shown a front view of the traditional hinge hanger base unit 402. The hook component 204 is along the same plane as the arm component 206. Thus, the hook component 202 and the arm component have a "flat" appearance.

Figure 4C:
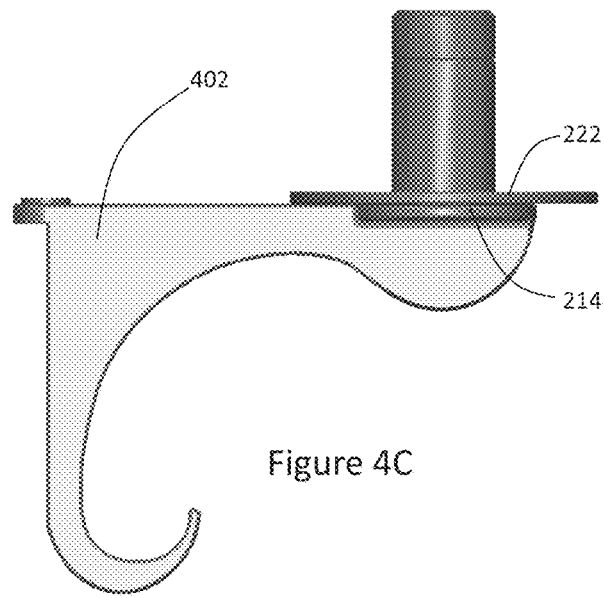
FIG. 4C shows a side view of the traditional hinge hanger base unit.

Referring to FIG. 4C there is shown a side view of the traditional hinge hanger base unit 402. The illustrative elastic base 222 sits on the rounded plate at the distal end 214.

Figure 4D:
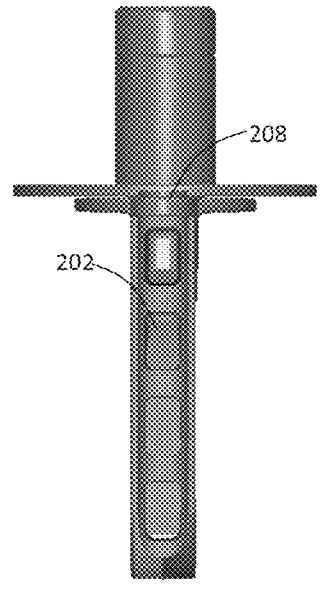
FIG. 4D shows a back view of the traditional hinge hanger base unit.

Referring to FIG. 4D there is shown a back view of the traditional hinge hanger base unit 402. The curved supporting connector 202 and the top lip 208 are configured to interface with a door hinge or the universal hinge bracket.

Figures 5A, 5B:
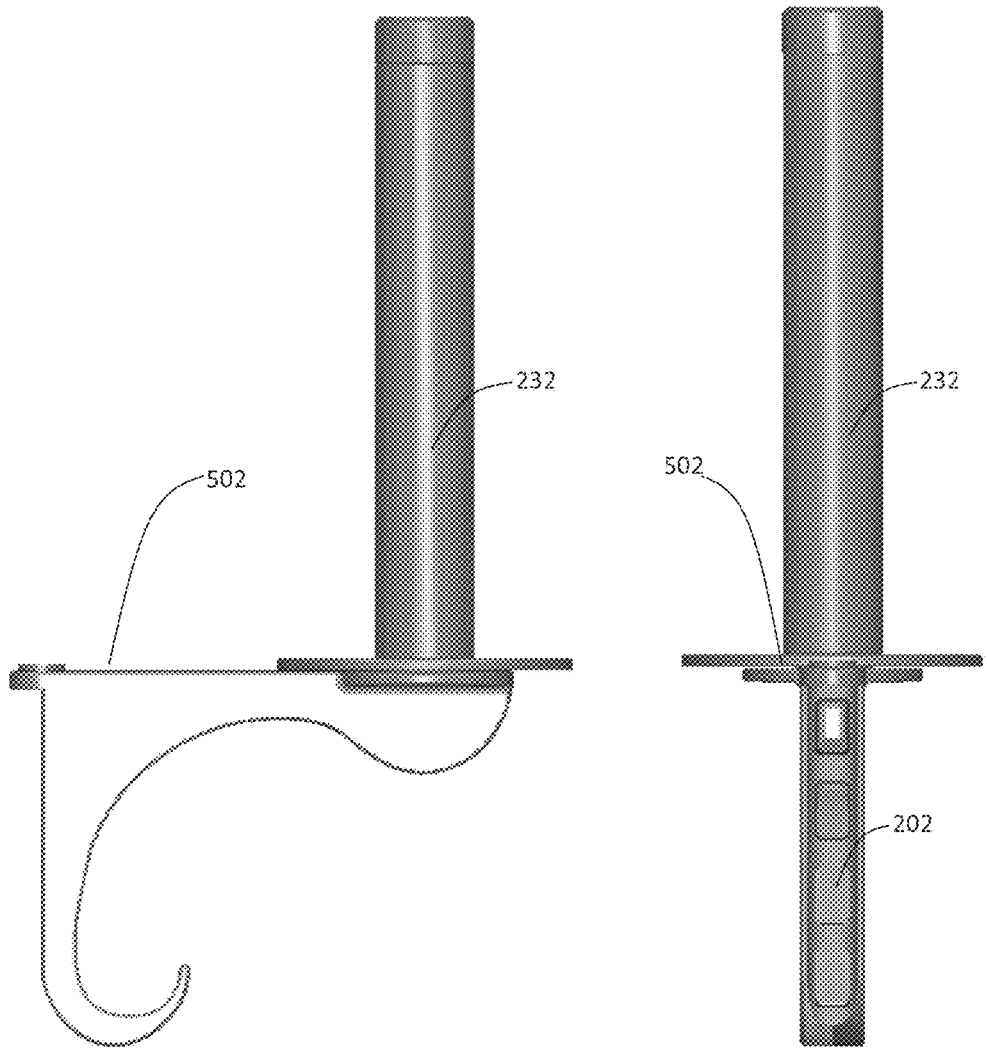
FIG. 5A shows a side view of the traditional hinge hanger base unit with a vertical upright tube that is approximately 4.5 inches.
FIG. 5B shows a back view of the traditional hinge hanger base unit with the 4.5 inch upright tube.

Referring to FIG. 5A there is shown a side view of the traditional hinge hanger base unit 502 with a vertical upright tube 232 that is approximately 4.5 inches long, and receives an illustrative roll of toilet paper. Referring to FIG. 5B there is shown a back view of the traditional hinge hanger base unit 502, which is similar to FIG. 2.

Figures 6A, 6B:
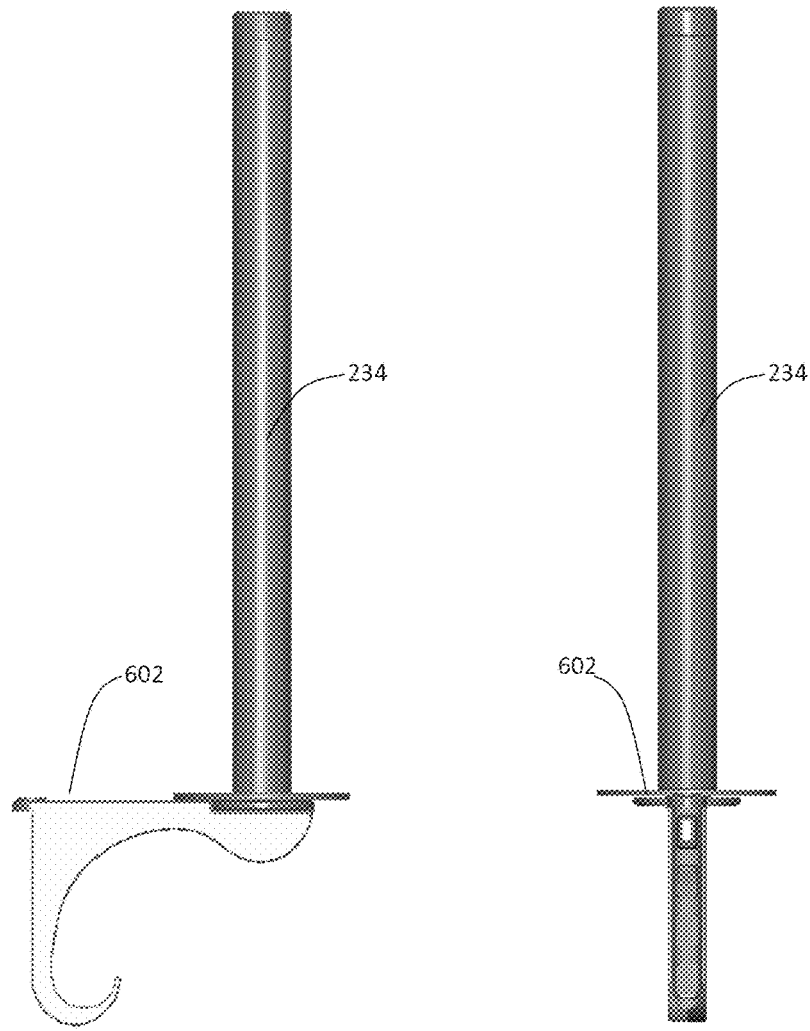
FIG. 6A shows a side view of the traditional hinge hanger base unit with a vertical upright tube that is approximately 13 inches.
FIG. 6B shows a back view of the traditional hinge hanger base unit with the 13 inch upright tube.

Referring to FIG. 6A there is shown a side view of the traditional hinge hanger base unit 602 with a vertical upright tube 234 that is approximately 13 inches long, and receives an illustrative roll of paper towels. Referring to FIG. 6B there is shown a back view of the traditional hinge hanger base unit 602.

Figure 7A:
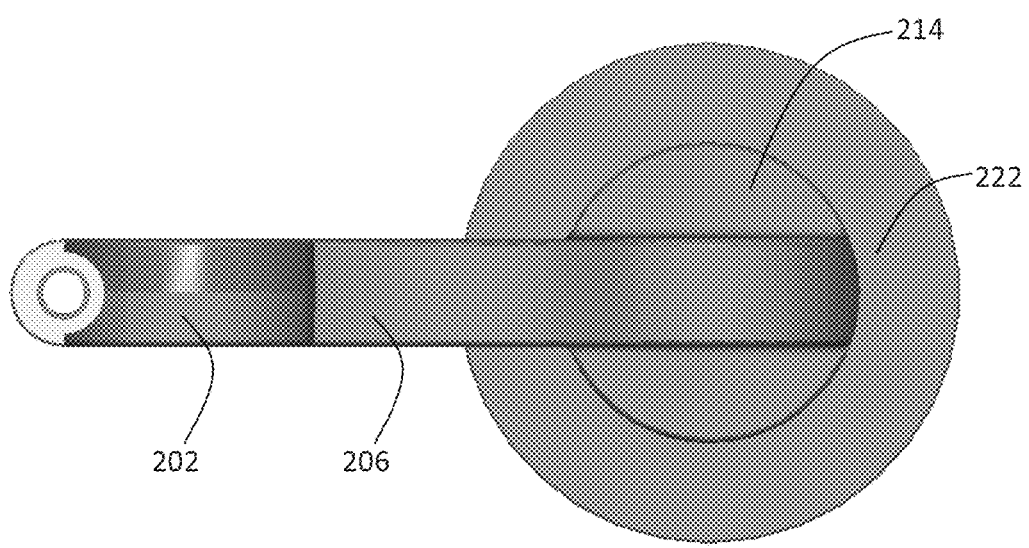
FIG. 7A shows a bottom view of the hinge hanger base unit presented herein.

Referring to FIG. 7A there is shown a bottom view of the hinge hanger base unit presented herein. The hook component 202 is along the same plane as the arm component 206 so that the hook component 202 and the arm component have a "flat" appearance. The elastic base 222 sits on the rounded plate at the distal end 214.

Figure 7B:
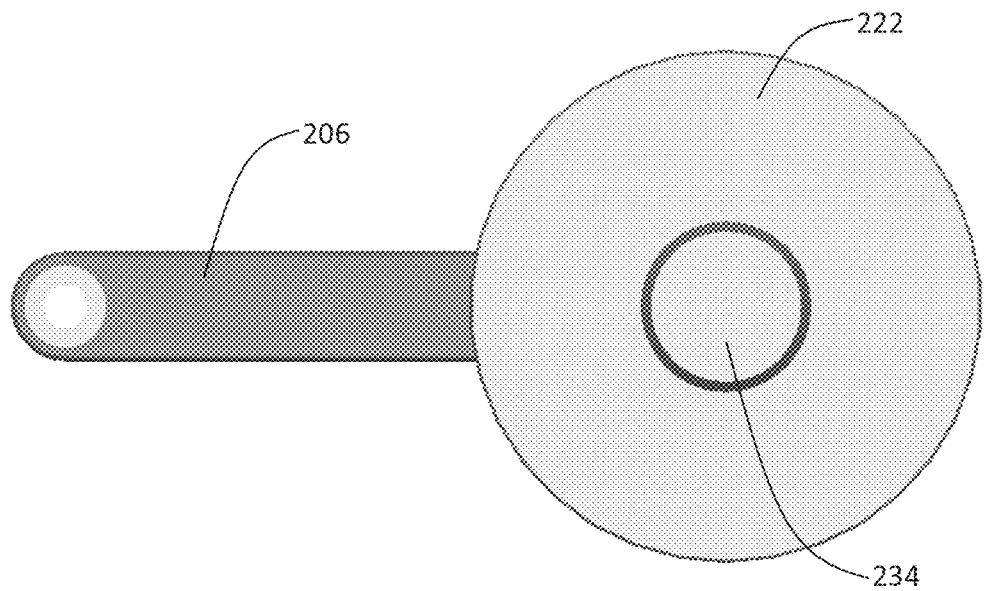
FIG. 7B shows a top view of the hinge hanger base unit presented herein.

Referring to FIG. 7B there is shown a top view of the hinge hanger base unit presented herein. In the top view, the arm component 206, the elastic base 222 and one of vertical upright tubes 224, 232 and 234 are visible.

The illustrative traditional hinge hanger base units presented from FIG. 4A-4D, FIG. 5A-5B, FIG. 6A-6B and FIG. 7A-7B are fully assembled hinge hanger base units as presented in FIG. 2. Alternatively, the traditional hanger base unit may be built from a single mold and provide the same appearance and function as the hinge hanger base unit 200.

Referring to FIG. 8A there is shown a perspective view of a "modern" hinge hanger base unit 800 with a small vertical upright tube. The modern hinge hanger base unit 800 is similar to the "traditional" hinge hanger base unit 200, 402, 502 and 602 presented above. For example, the modern hinge hanger base unit 800 includes the same vertical upright tube 224 as the hinge hanger base unit 402.

However, there are some differences between the modern hinge hanger base unit 802 and the traditional hinge hanger base unit. The most significant difference is the hook component of the modern hinge hanger base unit. More specifically, the curved supporting connector 802 has a bottom end 810 with an angled strip 812, in which the curved supporting connector 802 and the angled strip are disposed at an acute angle 814 to one another. The angled strip 812 is adjacent to a tip 814 that is parallel to the curved supporting connector 802. Additionally, the tip 814 disposed at an obtuse angle 818 to the angled strip 812.

Referring to FIG. 8B there is shown a front view of the modern hinge hanger base unit 800, which is similar to the traditional hinge hanger base unit 402 except for the hook component at the bottom end.

Referring to FIG. 8C there is shown a side view of the modern hinge hanger base unit 800, which is similar to the traditional hinge hanger base unit 402 except for the hook component at the bottom end.

Referring to FIG. 8D there is shown a back view of the modern hinge hanger base unit 802, which is similar to the traditional hinge hanger base unit 402 except for the hook component at the bottom end.

Figures 9A, 9B:
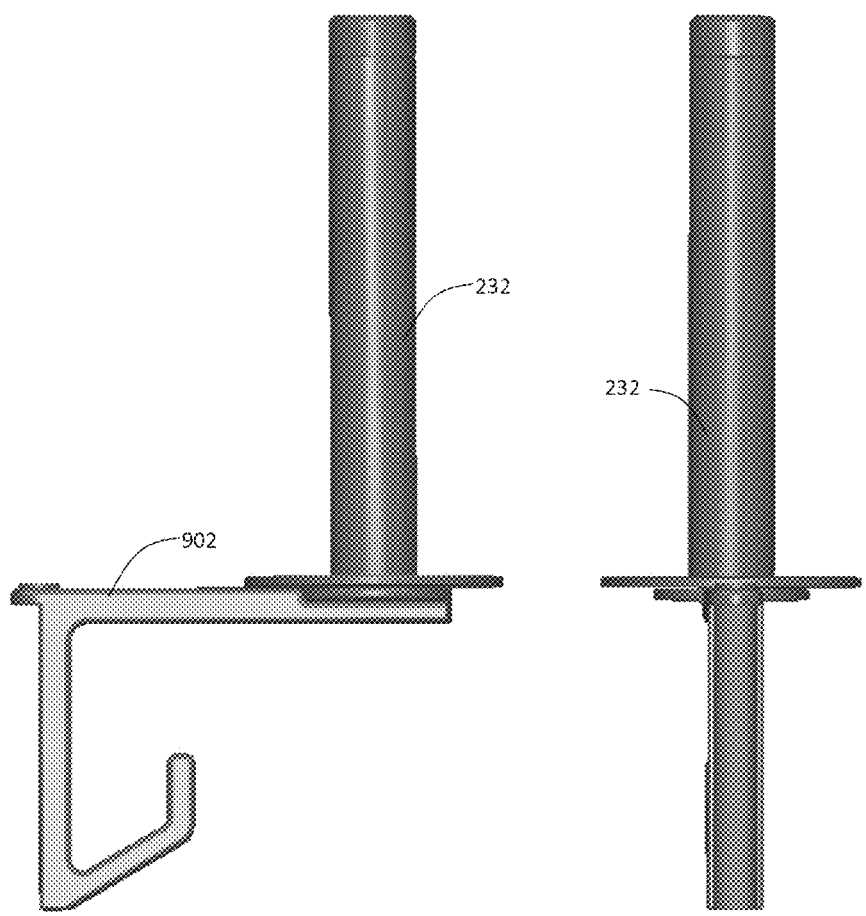
FIG. 9A shows a side view of the modern hinge hanger base unit with a vertical upright tube that is approximately 4.5 inches.
FIG. 9B shows a back view of the traditional hinge hanger base with a vertical upright tube that is approximately 4.5 inches.

Referring to FIG. 9A there is shown a side view of the modern hinge hanger base unit 902 with a vertical upright tube 232 that is approximately 4.5 inches long, and receives an illustrative roll of toilet paper. Referring to FIG. 9B there is shown a back view of the traditional hinge hanger base unit 902, which is similar to the traditional hinge hanger base unit 602 except for the hook component at the bottom end.

Figures 10A, 10B:
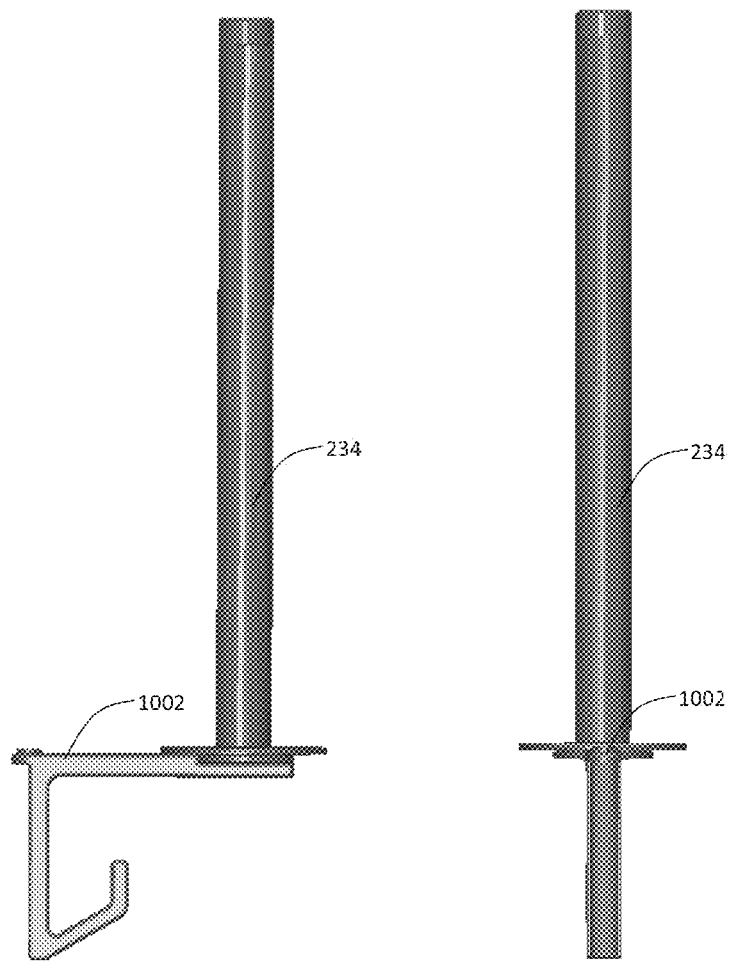
FIG. 10A shows a side view of the modern hinge hanger base unit with a vertical upright tube that is approximately 13 inches.
FIG. 10B shows a back view of the modern hinge hanger base unit with a vertical upright tube that is approximately 13 inches.

Referring to FIG. 10A there is shown a side view of the modern hinge hanger base unit 1002 with a vertical upright tube 234 that is approximately 13 inches long, and receives an illustrative roll of paper towels. Referring to FIG. 10B there is shown a back view of the modern hinge hanger base unit 1002 which is similar to the traditional hinge hanger base unit 702 except for the hook component at the bottom end.

There may be various "accessories" that can be combined with one or more of the embodiments presented above. The accessories may be sold separately and are configured to interface with the selected hinge hangar base unit. For example, the illustrative embodiments presented in 6A and 6B may include the traditional hinge hanger base unit 602 with the elongated 13 inch vertical upright tube; and the "accessories" for the base unit 602 may include the smaller vertical tube 224 or the middle length vertical tube 232. Also, accessories for the illustrative hinge hangar base unit 1002 (shown in FIGS. 10A and 10B) may include smaller vertical tube 224 or the middle length vertical tube 232. Other accessories are presented below in FIG. 11A through FIG. 12C.

Referring to FIG. 11A there is shown a perspective view of a dual hook accessory component. The dual hook accessory component 1100 includes a head 1102 with a cylindrically shaped cavity with opposing cuts. A second arm 1104 is adjacent to head 1102. A supporting member 1106 is orthogonal to the second arm 1104. Two opposing hooks 1108 and 1110 are disposed on an opposite end 1112 of the supporting member 1106. A ring 1114 is rotatably coupled to the support member 1106 at the opposite end 1112. Alternatively, the ring 1114 is fixedly coupled to the support member 1106.

The dual hook accessory component 1100 is configured to interface with arm component 206 (shown in FIG. 2). As previously stated, the arm component 206 includes a vertical upright component proximate to a distal end 214 of the arm component 206. The illustrative distal end 214 includes a rounded plate and a threaded cylindrical protuberance 212. The threaded cylindrical protuberance 212 is configured to receive the dual hook accessory component. The cylindrical protuberance 212 is shaped so that the dual hook accessory component 1100 may only be received in a single planar position.

Referring to FIG. 11B there is shown a side view of the dual hook accessory component 1100. The ring 1114 may include a pin, screw or other such fastener (not shown) that allows the ring 1114 to be coupled to the accessory component. By way of example and not of limitation, the ring 1114 is sized to receive a clothing hanger or hook and the hooks 1110 and 1108 can receive coats and towels.

Referring to FIG. 11C there is shown a front view of the dual hook accessory component. The dual hook accessory component 1100 is relatively planar or flat with the exception of the head 1102. Thus, when the dual hook accessory component 1100 is combined with the hinge hanger base unit 200, the combination share the same plane.

Figure 12A:
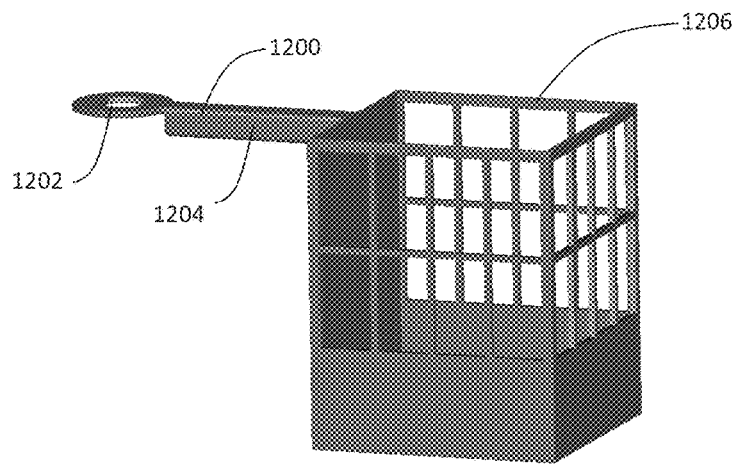
FIG. 12A shows a perspective view of a basket accessory component.

Referring to FIG. 12A there is shown a perspective view of a basket accessory component. The basket accessory component 1200 includes a head 1202 with a cylindrically shaped cavity with opposing cuts that interfaces with cylindrical protuberance 212. A second arm 1204 is adjacent the head is connected to basket 1206. By way of example and not of limitation, the basket 1206 is configured to receive items such as jewelry, watches, change, wallets, cards, cash and other such items.

Figure 12B:
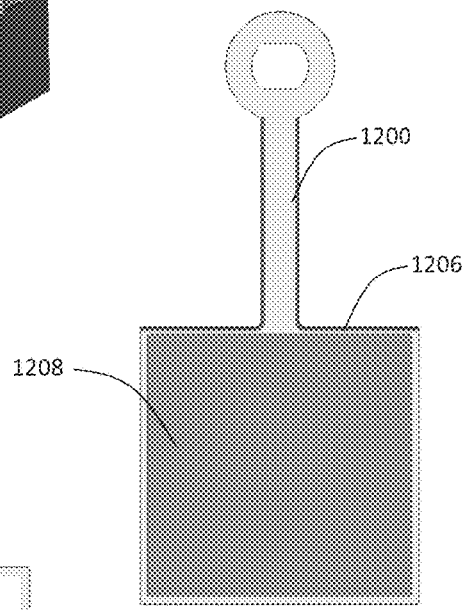
FIG. 12B shows a top view of the basket accessory component.

Referring to FIG. 12B there is shown a top view of the basket accessory component 1200. From the top view, the basket 1206 has a base 1208 that is substantially square. Alternatively, the base 1208 may be shaped as a rectangle, a triangle or any other such shape.

Figure 12C:
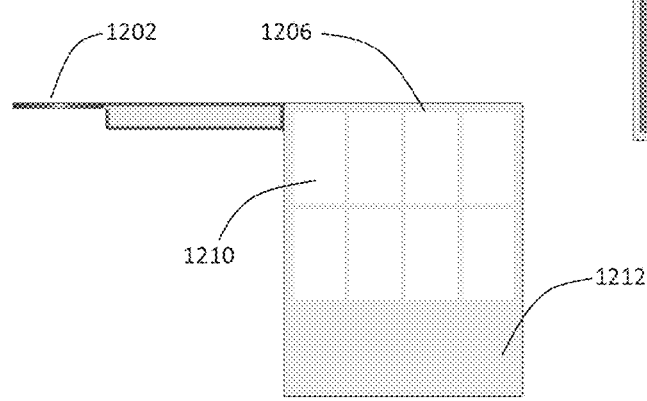
FIG. 12C shows a side view of the basket accessory component.

Referring to FIG. 12C there is shown a side view of the basket accessory component 1200. From the side view, the basket 1206 includes a plurality of rectangular cutouts 1210 at the middle and top of the basket 1206. The bottom 1212 of the basket 1206 does not include any cutouts so that items cannot fallout of the bottom 1212 of the basket 1206.

In an alternative embodiment, the head of the accessory component has a circular opening and the cylindrical protuberance does not have any cylindrical cuts so the accessory component can rotate about the cylindrical protuberance.

The accessory components presented above take advantage of unused space and provide additional storage space by being coupled to the door hinge or universal hinge bracket. With respect to the door hinge embodiment, the accessory components do not affect the operation of the door hinge.

The illustrative hinge hanger base unit and the accessory components presented herein can easily be installed and removed for repeated use. The design allows residential or commercial versions of the hinge hanger base unit and accessory components to be made from a wide range of materials. For example, the hinge hanger base unit and accessory components can be made from cast metal, injection molded plastic, plastic and metal, carbon fiber or even wood. Additionally, due to the curved support connector, almost any material can provide the inherent strength necessary for holding garments, objects and other materials that would readily suggest themselves.

It shall also be appreciated that the hinge hanger base unit can also be reshaped based on manufacturing methodologies provided it retains the curved spine, hole for pin attachment, vertical tube attachment and single point of accessory attachment.

The hinge hanger base unit and accessory components described above create storage from unused space, which is typically behind the door. Generally, the hinge hanger base unit and accessory components take advantage of the unused behind the door for hanging clothing, towels or for storing additional rolls of toilet paper or paper towels.

It is to be understood that the detailed description of illustrative embodiments are provided for illustrative purposes. The scope of the claims is not limited to these specific embodiments or examples. Therefore, various process limitations, elements, details, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A hinge hanger comprising:
a universal hinge bracket having a cylindrical component;
a curved supporting connector that is configured to interface with the cylindrical component,
 wherein the curved supporting connector has a top lip that interfaces with the cylindrical component,
 wherein the curved supporting connector has a bottom end that interfaces with the cylindrical component;
a hook component disposed at the bottom end of the curved supporting connector;
an arm component that extends from the curved supporting connector, wherein the arm component includes a threaded vertical arm element proximate to a distal end of the arm component;
a vertical upright tube having a threaded end that interfaces with the threaded vertical arm element corresponding to the arm component; and
an elastic base at the distal end of the arm component, wherein the elastic base is disposed between the vertical upright tube and the arm component.

2. The hinge hanger of claim 1 wherein the universal hinge bracket includes a hollowed cylindrical component that interfaces with the curved supporting connector.

3. The hinge hanger of claim 1 wherein the vertical upright tube is approximately 13 inches.

4. The hinge hanger of claim 1 wherein the vertical upright tube is approximately 4.5 inches.

5. The hinge hanger of claim 1 further comprising an accessory component that interfaces with the vertical arm element.

6. The hinge hanger of claim 1 further comprising an accessory component that includes an accessory arm component that includes a second hook component.

7. The hinge hanger of claim 1 further comprising an accessory component that includes a basket component.

* * * * *